Patented May 13, 1952

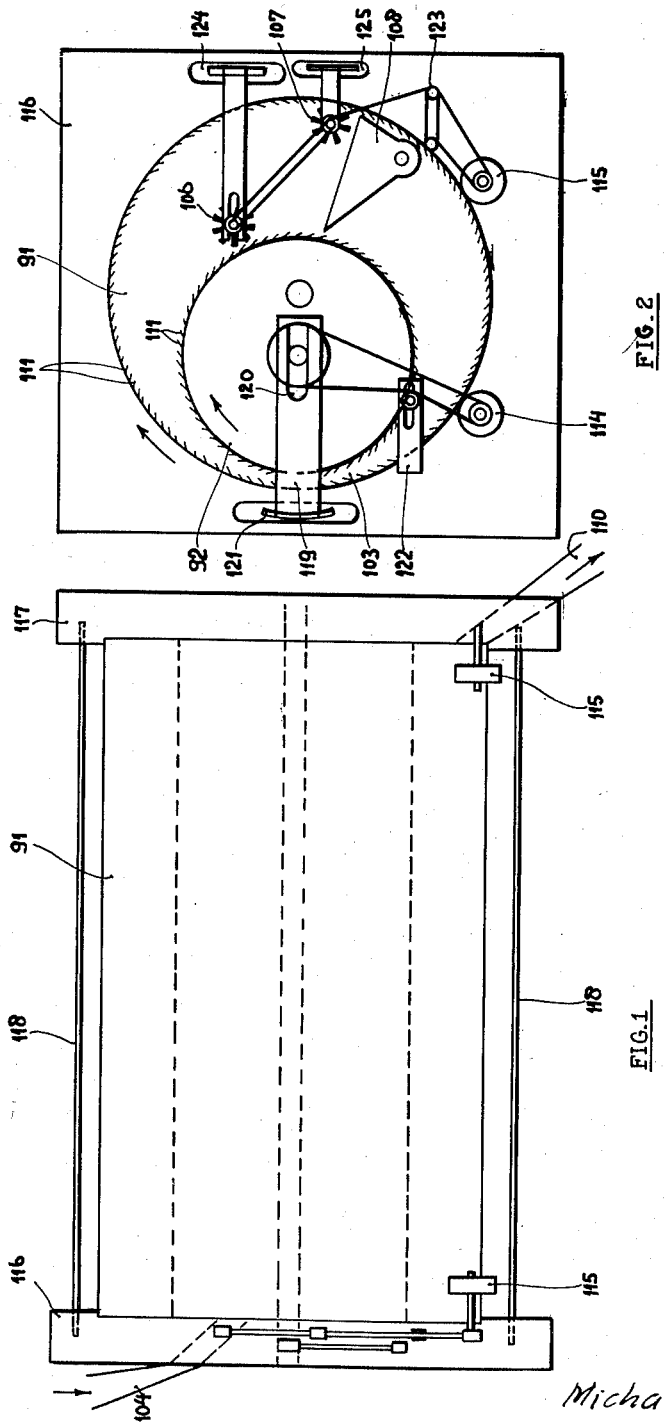

2,596,470

UNITED STATES PATENT OFFICE 2,596,470

PICKING OF GRANULAR PRODUCTS

Michael Jan de Goeje, Zaandam, Netherlands

Application December 5, 1947, Serial No. 789,799
In the Netherlands April 16, 1943

Section 1, Public Law 690, August 8, 1946
Patent expires April 16, 1963

3 Claims. (Cl. 209—109)

The invention relates to a picking device for separating the useless units of a granular product from the useful ones, and more particularly to a picking device for peas, seeds, grains and the like, wherein the sound units are separated from the worm-eaten or damaged ones by carrying the product to be picked along a picking surface covered with a plurality of needles which are slantingly directed against the flow of the product.

In a known device for this purpose use is made of a rotating cylindrical drum having its inner surface covered with needles. The stream of units to be picked is carried through this drum, and the worm-eaten or damaged units are pinned up on the needles of the drum or wedged between these needles and the drum surface, and are thereby carried along with the needles. A wiping off device in the most elevated part of the drum removes the useless units from the needles, whereupon they are caught in a discharge channel and discharged into a collecting tank. The sound units pass between the needles and are discharged from the drum through a second discharge.

Although the operation of the known device is not unsatisfactory, the useful output thereof is relatively small. I have found this to be due to two causes.

Firstly, I have found that the distance between the point of a needle and the picking surface is rather closely bound up with the average size of the units to be picked. Thus, for a coarse-grained product a larger distance between the needle points and the picking surface is required than for a fine-grained one. Since in the known device the length and the position of the needles are once for all determined by the construction of the drum, a maximum output will only be obtained for a definite size of the units. For smaller or larger units the output will be considerably less.

Secondly, I have found that in the known device only a relatively small part of the total picking surface is participating in the picking operation at one and the same time, so that the device is not operating very efficiently.

It is an object of the invention to provide a picking device for granular products having a larger output than a device of the known kind of the same dimensions.

Another object is to provide a picking device for granular products wherein the part of the total picking surface operative at one and the same time is larger than with the known devices, so that a greater efficiency is obtained.

Still another object is to provide a picking device having readily interchangeable picking surfaces, so that the length and the position of the needles may be chosen in such manner as to yield a maximum output for any particular product to be picked.

A further object of the invention is to provide a picking device for granular products wherein the propulsion of the units to be picked through a picking drum is at least partially obtained by a special shape or a special position of one or more picking leaves within said drum.

Other objects of the invention and the exact nature thereof will be apparent from the following description of an embodiment thereof, given with reference to the accompanying drawing, wherein Fig. 1 is a side view of a picking device having my invention embodied therein. Fig. 2 is a vertical cross section of said device.

Referring to Figs. 1 and 2, a rotatable picking drum 91 is shown, provided with needles 111 on its cylindrical inner surface, supported by carrying rollers 114, 115 and provided with a charging hopper 104 and a discharge 110 for the useful units. A rotatable inner drum 92 is eccentrically arranged within the drum 91, and is likewise provided with needles 111 on its outer surface. A narrow channel 103 is formed between the drums 91 and 92, which are rotating in the same direction. This channel has an initially decreasing and subsequently increasing diameter. The rollers 114, 115 drive the drum 91 and are attached to a frame consisting of a front part 116 and a back part 117, interconnected by rods 118. Suspending arms 119 are attached to the parts 116 and 117, and are provided with slots 120 and 121 supporting the inner drum. The inner drum 92 is driven from the axle of the carrying roller 114. A stretching device 122 serves to keep the driving chain or belt stretched upon a change of position of the inner drum. A wiping off brush 106 is provided for the inner drum 92, and a wiping off brush 107 for the main drum 91. These brushes are driven from the axle of roller 115 by means of a chain provided with a stretching device 123. The brushes 106 and 107 are adjustably supported by arms 124 and 125, attached to the front part 116 and the back part 117 of the the frame, respectively. The discharge for the useless units is indicated at 108.

In operation the inner drum 92 is adjusted in such manner that a pressure is exerted on the layer of units passing through the channel 103. The units are thereby carried along with the drums to a considerably greater height than in a device with only one picking drum, so that the picking surface operative at one and the same time is substantially increased.

If desired, the drums 91 and 92 may be provided with needles having a different length and position, so that a satisfactory picking action may be obtained for units of widely different sizes. The inner drum 92 is preferably arranged in such manner that its excentrical position within the main drum 91 may be easily modified, in order to adapt the device to products of different grain size. For the same purpose the inner drum is preferably arranged in such manner that it may easily be taken out and replaced by another drum having needles of different size and position.

Instead of the rotatable drum 92 use may also be made of a stationary surface not provided with any needles and arranged opposite the upwardly moving needles of the main drum in such manner that an upwardly narrowing slot is formed between both surfaces in which the layer of units carried along is pressed upwards.

From the above description, it will be clear that the invention provides a picking device for granular products, wherein a very large picking surface is operative at one and the same time, so that the device has a large capacity with respect to the room occupied. Moreover the device according to the invention provides a satisfactory operation for products of widely different grain sizes.

Although the invention has been explained hereinbefore with reference to a particular embodiment, it is to be clearly understood that this is only shown and described by way of example and not as a limitation on the scope of the invention as set forth in the appended claims.

Reference is herein made to my copending application Serial No. 185,093, filed August 29, 1950, which is a divisional of the present application.

I claim:

1. A device for separating worm eaten peas from sound peas, comprising a rotatable cylindrical drum provided on its inner surface with a plurality of needles pointing in the direction of rotation, and adapted to impale the worm eaten peas, a second drum eccentrically positioned within the first drum, rotatable in the same direction as the outer drum, provided on its outer surface with a plurality of needles pointing in the direction of rotation, and adapted to impale the worm eaten peas, with a free gap between the needle points on the said drums, means to supply all peas to one end of said first mentioned drum, means to discharge the sound peas from the other end of said first mentioned drum, wiping off means adapted to remove the impaled worm eaten peas from each of the needle surfaces and means adjacent to said wiping off means for discharging the worm eaten peas from said first mentioned drum.

2. In a device according to claim 1, adjustable supporting means for said inner drum for adjusting the width of the gap between the inner drum and the outer drum.

3. A device according to claim 1, in which the needles on the inner drum are of a different length from the needles on the outer drum, and are set at a different angle with respect to the respective drum.

MICHAEL JAN DE GOEJE.

REFERENCES CITED

The following references are of record in the file of this patent:

UNITED STATES PATENTS

| Number | Name | Date |
| --- | --- | --- |
| 174,078 | Kurth | Feb. 29, 1876 |
| 1,546,132 | Heisman | July 14, 1925 |
| 2,246,851 | Jorden | June 24, 1941 |

FOREIGN PATENTS

| Number | Country | Date |
| --- | --- | --- |
| 19,321 of 1891 | Great Britain | Sept. 3, 1892 |
| 436,032 | Great Britain | Oct. 3, 1935 |